United States Patent [19]

McCorkle

[11] Patent Number: 4,591,795
[45] Date of Patent: May 27, 1986

[54] SIGNAL CONDITIONING CIRCUIT FOR L/R VDT SENSORS

[75] Inventor: Gary A. McCorkle, Tucson, Ariz.

[73] Assignee: United Technologies Corporation, Hartford, Conn.

[21] Appl. No.: 656,570

[22] Filed: Oct. 1, 1984

[51] Int. Cl.[4] .................... H03K 5/00; H03K 5/22; G08C 19/06
[52] U.S. Cl. ................ 328/5; 307/352; 307/494; 328/127; 328/151; 340/870.36
[58] Field of Search .................... 328/5, 127, 151; 307/352, 494; 340/870.36

[56] References Cited

U.S. PATENT DOCUMENTS

| | | | |
|---|---|---|---|
| 3,600,669 | 8/1971 | McClain | 340/870.36 |
| 4,053,849 | 10/1977 | Bower et al. | 328/5 |
| 4,109,200 | 8/1978 | McNulty | 340/870.36 |
| 4,420,727 | 12/1983 | Rau | 328/5 |

Primary Examiner—Stanley D. Miller
Assistant Examiner—B. P. Davis
Attorney, Agent, or Firm—Francis J. Maguire, Jr.

[57] ABSTRACT

A highly accurate signal conditioning circuit for use with a linear/rotary variable differential transformer (L/R VDT) operating in a unipolar mode is disclosed. The circuit may be utilized for ratiometric comparison of L/R VDT primary coil peak excitation and L/R VDT secondary coil peak response. Unique peak detectors are used for detecting both primary and secondary peak values. The circuit may include an oscillator having R and C elements in a tank circuit which also includes the L/R VDT primary coil. Offset errors may be determined externally by providing for a momentary shutdown of the oscillator to permit the measurement of DC components to the signal conditioner and excitation DC outputs, by external means.

4 Claims, 5 Drawing Figures

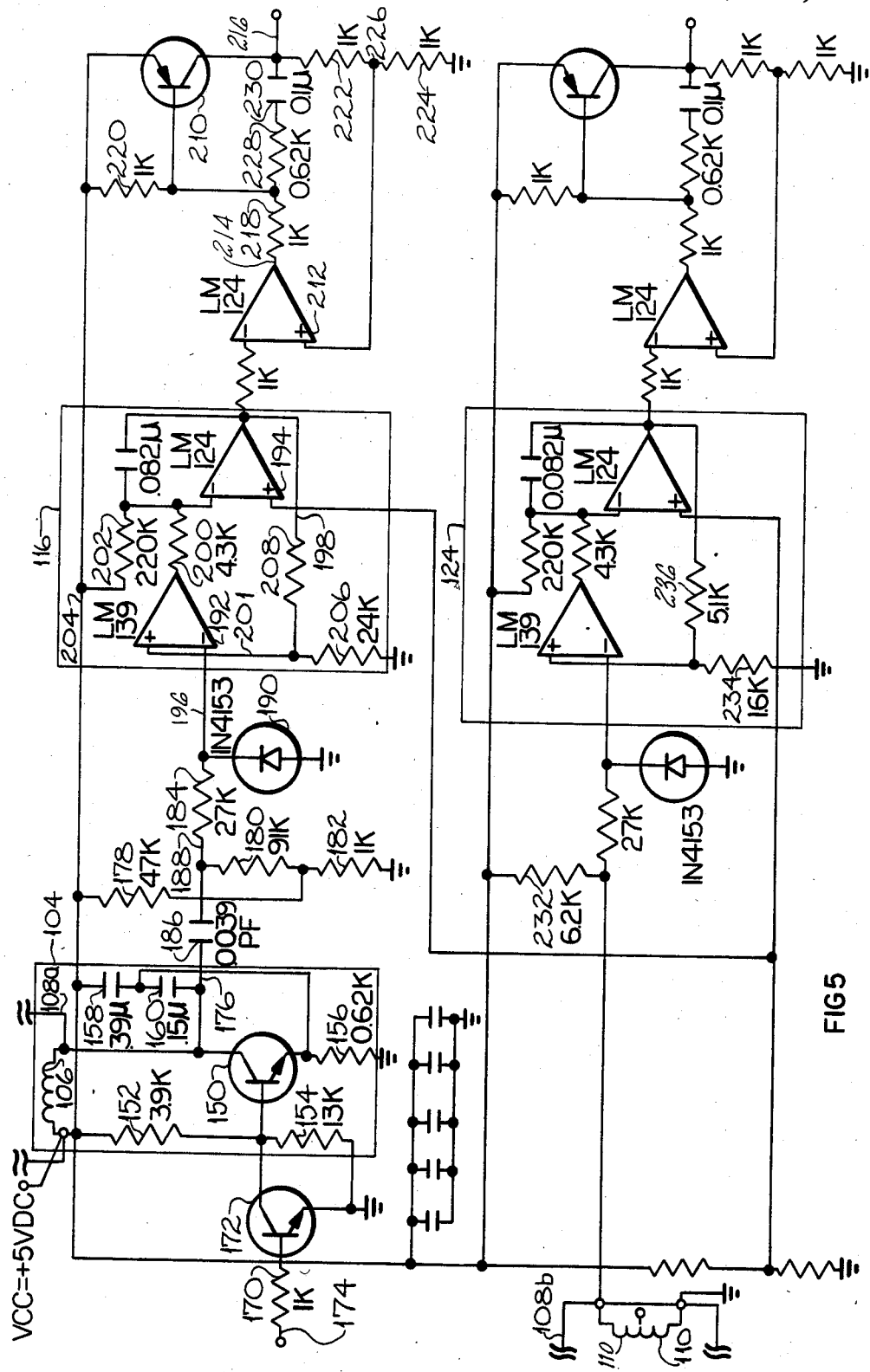

SIGNAL CONDITIONING CIRCUIT FOR L/R VDT SENSORS

DESCRIPTION

TECHNICAL FIELD

This invention relates to a signal conditioning circuit for linear variable differential transformers (LVDTs) or rotary variable differential transformers (RVDTs).

BACKGROUND ART

Commercially available displacement sensors produce either digital or analog outputs. The analog output types include variable resistors, capacitors in single-coil units, and multiple-coil inductive sensors. Among the later type, the linear variable differential transformer (LVDT) and the rotary variable differential transformer (RVDT) are iron-core transformers with a moveable core having three windings which sense a linear displacement. LVDTs and RVDTs are used to measure linear or angular displacement and are connected mechanically between the object being sensed and a reference object. The analog output voltage is proportional to the displacement of the moveable core. It can be used to measure motion or position.

The primary winding is energized with an AC voltage source. The LVDT's secondary windings are to produce opposing voltages and are connected in series opposition to produce an output voltage which is the difference of the two secondary voltages. With the core centered in a neutral or zero position, the two secondary voltages are equal and opposite and the differential is theoretically zero. This is the balance or null position. If the core is displaced, the magnetic coupling between the primary and one of the secondaries increases and the coupling between the primary and the other secondary decreases. Thus, an output voltage is produced which increases as the core is moved further away from the null position. The phase between the input voltage and the output voltage increases or decreases as a function of the direction in which the movable iron-core is moved. At the null point, movement of the core in either direction across the null boundary produces a 180° phase reversal. The amplitude of the secondary output voltage forms a V-shaped curve when plotted versus core displacement. At the V's "knee", corresponding to the null point, the phase angle abruptly reverses by 180°. The voltage at the "knee" is not exactly zero. A small residual null voltage contains a component 90° out of phase with the fundamental and higher harmonics of the input voltage.

Demodulator circuits are normally used to eliminate the residual voltage at the null and to produce a DC output from the secondary winding which may then be used with standard DC instruments. As mentioned above, RVDTs are also commercially available for angular displacement measurement where the movable iron-core rotates about a fixed axis. The principles of operation of the LVDT and the RVDT are basically the same.

LVDTs and RVDTs have a frequency dependent phase shift associated with the particular characteristics of the device. This phase shift is in addition to the 180° phase shift which occurs when passing through the null position. Two methods are used in the prior art to compensate for the secondary phase angle shift. The first method is to adjust the excitation frequency in a manner to cause the secondary voltage to be in phase with the primary excitation. If the primary excitation is referenced to the synchronous demodulator, optimum rectification occurs at zero phase differential between secondary AC phase and demodulator switching, relative to the waveform zero crossings. In addition, according to the prior art, exciting the L/R VDT at its zero phase angle frequency results in minimum sensitivity to frequency and temperature variations.

Another way of providing phase compensation is to use a variable phase shift network between the excitation output and the synchronizing reference input to the L/R VDT signal conditioner. In this case, the excitation frequency remains fixed and a potentiometer in an RC circuit is tuned for optimum demodulator phasing. According to the prior art, proper phasing of the synchronizing reference signal to the demodulator results in optimum sensitivity and linearity.

The phase error described above is a characteristic peculiar to the synchronous demodulator (product detector) scheme used in the prior art. Basically, a coherent, in-phase reference is needed by the product detector to enable it to output a full wave rectified signal wherein the baseline of the rectified signal is at a reference point. If there is a phase error, the output signal will have excursions on the wrong side of the baseline. This means that the filtered DC output which is representative of the L/R VDT position will be in error, inasmuch its amplitude will be off relative to the baseline reference voltage, since the signal has to average out for those portions on both sides of the reference baseline. Since the L/R VDT is an inductive device with the usual phase shift of an AC signal, phase shifting is used to put the product detector reference signal back into phase with the L/R VDT output signal to be demodulated. The prior art solution described above, using an RC filter introduces component inaccuracies and temperature coefficients of these elements which must be considered.

If the temperature range which the LVDT or RVDT must be capable of operating within is relatively large, e.g., −40° C. to +85° C. a simple RC circuit will give, according to the prior art, roughly plus or minus 5% stability over the temperature range. This figure can be considerably higher in many cases.

In addition, frequency accuracy is also a factor in the phase shift. A typical prior art device might exhibit a 6° phase shift at 2.5 KHz or 12° at 5 KHz.

The phase shift tolerance from device to device can vary by as much as 0.5%. Phase shift will also be affected by temperature as R and L vary and since the sensitivity error due to temperature can be approximately +0.7%, the overall worse case phase shift error can be as high as about +1.2% at 5 KHz.

Another item to consider in phase shift is the accuracy of the excitation frequency itself. If a simple RC oscillator is assumed, the best that can be hoped for in accuracy over the temperature range (with 1% components) is roughly 5%. A 5% shift in frequency translates to, for all practical purposes, a 5% shift in phase for RL elements involved. A reasonable breakdown of this figure into ambient and temperature coefficient percentages would likely be roughly 4% and 1%, respectively.

Although the temperature coefficient of the oscillator components and the phase shifter components should be the same, resulting in some tracking, causing the phase shift elements to shift in a roughly compensatory manner, this cannot be determined with any exactness so worse case conditions must be assumed.

In addition, the simple RC oscillators used in prior art devices produce non-linear, non-sinusoidal signals with significant harmonic content. These harmonics produce even more voltage and phase shift errors in the output of the product detector. Where non-linear networks have been used to produce approximations to a sine wave output, the harmonic distortion typically remains at 5% because of the inexact nature of the non-linear approximation techniques.

The overall phase shift error thus can be as high as approximately 12% (about 10% for spread and 2% for temperature deviations). It is difficult to put an exacting percentage of error that this phase shift error has on the product detector output. However, it is evident that for 12% of a half wave period, the polarity of the demodulator output signal will be in error.

The next errors to consider in the prior art LVDTs and RVDTs are demodulator errors. These include linearity, offset, offset temperature coefficient, and reference accuracy. The linearity error it is often as much as 0.5% over the temperature range. The offset voltage worst case over temperature range may be as high as 100 mv in a +5 volt device. The offset temperature coefficient can be as high as 0.25 millivolts per degree centigrade. The reference voltage error can often be as high as +3% of Vcc/2. Since the reference is derived by a resistive divider in the prior art, there has to be a temperature coefficient based on temperature coefficients on IC resistor to resistor variations as a function of temperature, and the reference source temperature coeffcent should be on the order of 0.01%/°C. This translates to roughly ±0.6% at the temperature extremes.

Other items to consider include the temperature sensitivity of the output buffer stage typically used in the prior art, conversion errors associated with the analog to digital converter used, the deviation of the sensitivity of the device from unit-to-unit, the distortion of the excitation signal due to the LVDT transformer, and excitation amplitude. This last includes simple output amplitude accuracy, the amplitude temperature coefficient, and the sensitivity to power supply variations.

When taken in their totality, the accumulative effects of all of these sources of error can be extremely high in the worst case.

A new circuit design approach is required in some cases in order to avoid many of these sources of error.

DISCLOSURE OF INVENTION

The object of the present invention is to utilize a variable differential transformer in a unipolar mode and to condition the signals associated therewith in such a way as to avoid many of the sources of error in the prior art.

According to the present invention, a variable differential transformer used for measuring linear or rotary displacement is used in its linear region only, on one side of the null point only, and a special peak detector is used in both excitation and output stages in order to measure, on a ratiometric basis, the signals representative of the displacement to be measured, in a signal conditioning circuit having an oscillator incorporated therein using the L/R VDT prinary as the inductive element of the oscillator.

In further accord with the present invention, offset error may be determined and subtracted out by external circuitry by momentarily shutting down the oscillator and measuring the DC components to the signal conditioner and excitation outputs.

Since the displacement is measured only on one side of the null point, there is no need to use a product detector for sensing phase reversal when passing through the null point. This eliminates the concerns for frequency stability and phase matching plus temperature effects for the same. As has been disclosed, a special peak detector is sufficient. The special peak detector is disclosed and claimed separately in copending application Ser. No. 656,568 entitled "A LINEAR SLOPE PEAK DETECTOR" invented by Gary McCorkle and assigned to the assignee of this invention, and is hereby expressly incorporated herein. A varity of other techniques may be used in this unipolar approach to eliminate most of the other errors.

For all practical purposes, the two aforementioned features of the present invention eliminate all but the linearity sensitivity error, the output signal conditioning gain error, and errors associated with annalog to digital conversion resolution. To quantify these errors, using a unipolar design with a peak detector the only errors remaining are attributable to LVDT linearity on the order of ±0.5%, an LVDT temperature coefficient on the order of ±0.7%, output buffer gain error on the order of 3%, and ADC resolution.

To illustrate what the remaining errors amount to in terms of positional measurement accuracy, it is necessary to consider what the impact is on a point-by-point basis. This allows selection of a linear region in the LVDT most suited for the task. It can be intuitively appreciated that near the null point, offset errors of any sort having a devastating effect on percentage of accuracy; but in terms of magnitude of error, purely in terms of displacement, the limits of the range are most error prone. In terms of relative accuracy, the offsets are significant on a percentagewise basis as the LVDT approaches the null point where displacement and corresponding LVDT output voltages are small. These same offsets diminish in the magnitude of their percentage effect on accuracy as displacement increases and LVDT output voltages approach maximum. Thus, there are two ways to view the effects of these errors. One is on a percentage basis and the other is on a strict plus or minus positional units basis. In the former case, the percentage of error is dramatic near the null point and asymptotically approaches a minimum percentage of error figure as overall displacement increases. In the later case, the displacement error in positional units, e.g., step or motor steps, starts off as a minimal figure and linearly increases to a maximum at maximum displacement of the LVDT. This follows a typical mx+b curve where "m" is the percentage error and "b" is the offset.

Restricting the physical operating range of the LVDT or RVDT so as to not pass through its null point, and designing a circuit most suited to unipolar operation, is a functional philosophy change which is found to reduce the unacceptably high measurement errors of the prior art. The principal failings of the prior art approach involving such things as the accumulation of temperature coefficient effects from a complex circuit, lack of true and simple ratiometric sampling of excitation versus output, distortion and phase errors associated with the synchronous (product) detector scheme, and the inability to determine and factor out offsets, are obviated by the present invention. Since unipolar L/R VDT operation does not require any recognition of phase reversal, the need for a synchronous detection scheme is not needed. Simple peak detection and ratiometric measurement of both the excitation and LVDT or RVDT output eliminates the errors introduced by excitation amplitude and frequency/phase errors, both fixed and temperature dependent, and also eliminates the prior art demodulator linearity and phase errors (associated with compensation networks), both fixed and temperature dependent. Of course, the restriction of the L/R VDT operation to one side of the null may have disadvantages in some cases. In such cases, the disadvantages may outweigh the advantages of the present invention and the prior art signal conditioning circuitry must be used.

A custom circuit designed to generate a cleaner sine wave which may be incorporated in the signal conditioning circuit of the present invention is recommended using the LVDT or RVDT primary as an inductive element in the oscillator stage. Using the L/R VDT primary directly as the inductive element in an LC oscillator, which is inherently sinusoidal, eliminate those harmonics (odd) that would affect the peak detector's ratiometric accuracy. Where harmonics are present, the L/R VDT would act as a filter so that L/R VDT output peak would not be proportional to excitation peak on account of odd harmonics being inductively filtered out. This technique reduces the effects of distortion to a negligible amount.

In addition, by periodically suspending LVDT excitation, the DC components of both the excitation and L/R VDT output channels up to and including the analog to digital converter are measured and may be factored out of subsequent measurements which takes care of fixed, aging, and temperature dependent effects throughout the life of the signal conditioning unit.

As mentioned, the technique of the present invention reduces the measurement errors to those introduced by temperature dependent characteristics and aging of the gain of the system (LVDT), output peak detector (ADC channels for example), and the ever present ambiguity of the ADC itself in terms of its resolution. If maximum amplitude output of the LVDT is scaled to be reasonably commensurate with the full range of a Vcc referenced ADC, the positional error will be ambiguous to an extent determined by the LVDT sensitivity and an arbitrary integer gain picked to roughly fit a Vcc reference in an ADC, and power supply margin. This is a constant positional error throughout the entire linear LVDT displacement range.

Initial gain disparities can be determined by end of line calibration. This leaves temperature dependent drift to be considered. Typical inter-resistor drift is on the order of 0.01%/°C. for the usual P-type diffusion resistors on board IC's. In the excitation source, the circuit design provides for temperature tracking and adequate bandwidth between the oscillator and filter elements so that distortion is kept supressed. This leaves the gain disparities in the excitation and LVDT output peak detectors and/or any pre/post amplification buffers to consider. This is principally the input and feedback resistor networks. Assuming the worst problem would be one amplifier increase in gain as much as temperature deviation would cause (about plus 0.65%) and another decrease similarly (−0.65%) for a −40° C. temperature the overall temperature dependent gain shift is about ±1.3%. Channel gain disparities of the ADC might be on the order of +0.6%. This produces an overall gain error of ±1.9% total. This is a percentage of point error throughout the linear range of the LVDT or RVDT. Once the device begins operation, internal heating will diminish the cold temperature deviation. The +85° C. deviation is a lesser ±0.6% amount, yielding a gain error of ±0.8% overall which, of the two temperature extremes, would be the more persistent.

Converting the ±1.9% gain error to a physical displacement error in an LVDT having a maximum displacement of one half inch, the gain error is ±0.095 an inch. Adding the ADC ambiguity of +1.5 LSB or, in this case, ±0.0034 inch, the measurement error would be +0.0129 inches maximum at one half inch displacement of the LVDT. At +84° C. the error is only slightly less at a calculated +0.0124.

These and other objects, features, and advantages of the present invention will become more apparent in the light of the following detailed description of a best mode embodiment thereof, as illustrated in the accompanying drawing.

BRIEF DESCRIPTION OF THE DRAWINGS

FIG. 5 is a simplified schematic block diagram illustration of a signal conditioning circuit according to the present invention incorporating all of the features of FIG. 4.

BEST MODE FOR CARRYING OUT INVENTION

Figure 1:
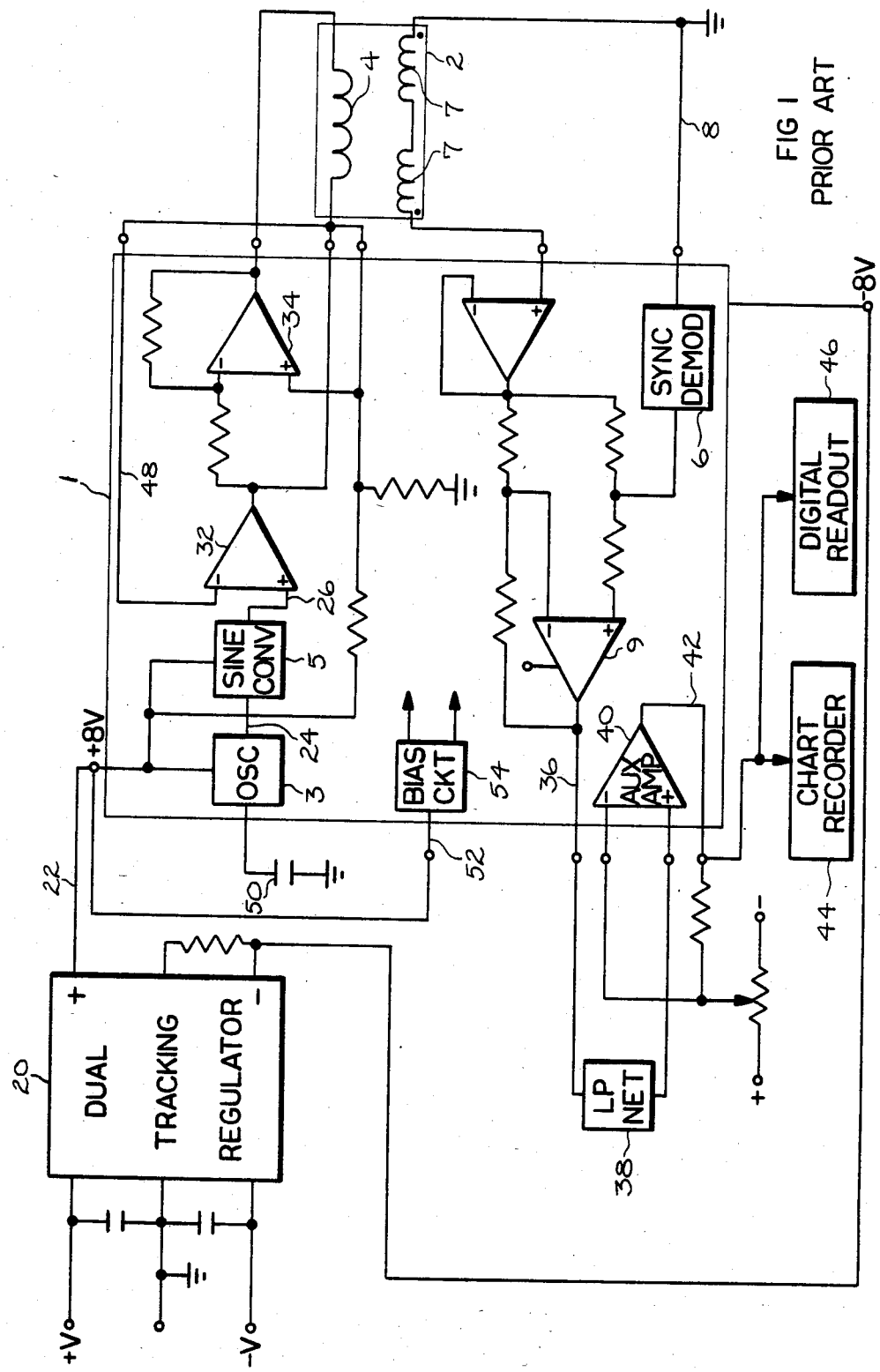
FIG. 1 is a simplified block diagram illustration of an LVDT signal conditioning circuit utilized according to the prior art.

FIG. 1 is an illustration of a prior art signal conditioner 1 for use with a linear variable differential transformer 2 (LVDT). The circuit includes a low distortion amplitude stable triangle wave oscillator 3 with programmable frequency to drive the primary 4 of an LVDT; a converter 5 converts the triangle wave to a sine wave; a synchronous demodulator 6 converts the LVDT output amplitude and phase information from a pair of secondary windings 7 on a line 8 to position information; and an output amplifier 9 provides gain and filtering.

An external dual tracking-regulator 20 provides a positive DC level on a line 22 to the triangle wave oscillator 3 which generates a triangle waveform on a line 24. The triangle output is then converted into a sine wave by the sine converter 5, the output of which, on a line 26, is applied in phase opposition to the primary 4 of the LVDT 2.

The synchronous demodulator 6 performs full wave rectification in phase synchronism with the above oscillator output. In order to extract true position information, the phase relationship of the LVDT secondary must be obtained. This means that as the LVDT core passes through the null, an abrupt 180° phase change occurs. Once full wave rectification is accomplished, the resulting signal carrier frequency must be removed by filtering. Demodulator output on a line 36 is provided to an active filter 38 incorporating an auxiliary op amp 40. The objective is to provide the original position information ripple free on a line 42 which may be presented for readout purposes on a chart recorder 44 or a digital readout 46.

Other functions include buffer amplifier feedback on a line 48 in the oscillator circuit. The loop is closed with negative feedback around both amplifiers operating at unity gain.

An oscillator timing capacitor 50 controls the frequency. The frequency is related by an equation $f_{OSC} = 110/C(\text{microfarads})$.

As noted above in the background art section, the typical prior art LVDT signal conditioning circuit, as exemplified in FIG. 1, is designed for use with an LVDT having an actuator that is permitted to cross over the null point. As described in detail in the background art section, this approach introduces a degree of complexity which is necessary as a result of using a bipolar transfer function.

In the prior art circuit, there are two methods of biasing the signal conditioning circuit 10. The first method is to provide a fixed reference voltage (not shown) such as +8 volts on a line 52 to bias circuitry 54. This "fixed" reference voltage will vary with an incoming poorly regulated supply. This might occur in automotive applications, for example. With supply voltage variations, the DC voltage on the line 42 will not vary with the supply but will vary within the common mode limits of the amplifier 40 as the LVDT core traverses its path. The output voltage on the line 42 at the LVDT null will be the voltage on the line 52 divided by two. Thus, for the case mentioned with eight volts applied, the null voltage will be +4 volts. Depending on the size of the linear portion of the transfer function, the maximum linear swing might be, for example, 1.5–8.5 volts around this value.

An alternate method of biasing, as shown in FIG. 1, is known as the "ratiometric" mode. In this case, the DC level on the line 22 is connected to the bias circuit input line 52. Since the signal on the line 22 controls the DC common mode voltage of the demodulator and the oscillator RMS output, these magnitudes will now change with supply voltage. The DC output from the auxiliary amp 40 on the line 42, using a single ground referenced supply, will be "ratiometric" with the supply voltage and centered within the common mode range of the output amplifier when the LVDT transducer is at null.

Figure 2:
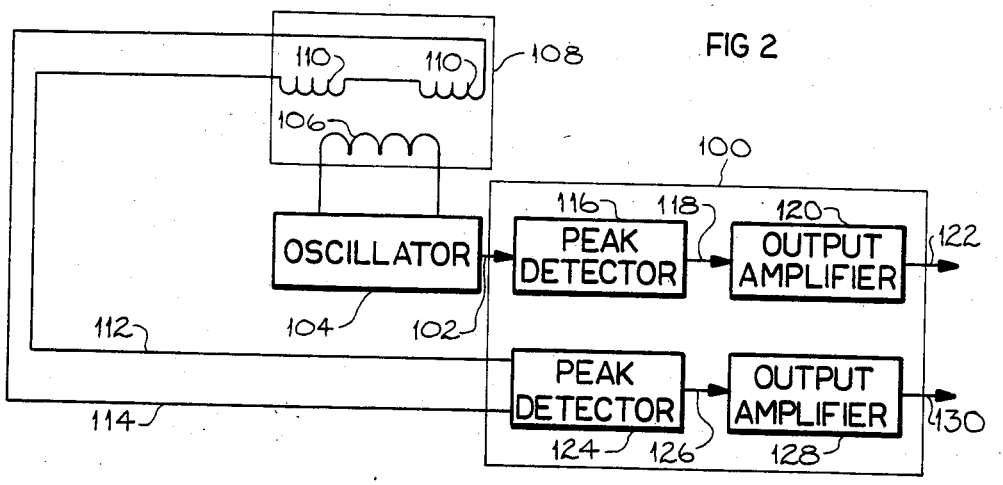
FIG. 2 is a simplified block diagram illustration of a signal conditioning circuit according to the present invention.

FIG. 2 is an illustration of an linear/rotary variable differential transformer (L/R VDT) signal conditioning circuit 100, according to the present invention. The circuitry is designated "linear/rotary" because the circuitry design principles are equally applicable to either a linear or a rotary variable differential tranformer. The signal conditioning circuit 100 receives a rectified sine wave output on a line 102 from an oscillator 104 external to the signal conditioning circuit 100. The oscillator is an LC type having a tank circuit that utilizes the primary winding 106 of an L/V VDT 108 as the inductive element in the tank circuit. The secondary windings 110 of the L/R VDT provide output signals on lines 112, 114 to the signal conditioning circuit 100.

The signal conditioning circuit 100 includes an excitation peak detector 116 that provides a signal indicative of the peak excitation on a line 118 to an excitation output amplifier 120. An output signal on a line 122 from the output amplifier 120 is indicative of the present value of the peak excitation voltage.

An output peak detector 124 provides a signal on a line 126 indicative of the magnitude of the peak output voltage from the secondary winding 110. The signal on the line 126 is amplified by an output amplifier 128 which provides an output signal on the line 130 indicative of the displacement being measured.

The peak detectors 116, 124 are of a specially designed type, to be disclosed in more detail below, and may be characterized as linear slope peak detectors. They are more accurate than the typical RC peak detectors of the prior art.

It should be understood that although the oscillator 104 of FIG. 2 has been described as providing a rectified output signal on the line 102 (thereby assuming that a rectifier of some kind is contained within the oscillator 104) the oscillator could as easily provide a pure sine wave on the line 102 which may be rectified within the signal conditioning unit 100 before being applied to the peak detector 116. Similarly, although the secondary winding 110 of the L/R VDT has been described as providing a signal on the lines 112, 114 which, in the illustration would indicate that a pure sine wave is applied to the peak detector 124, it should be understood that the sine wave output of the secondary must be rectified at some point before being applied to the peak detector 124. Thus, a rectifier should be assumed in FIG. 2 to be within the peak detector 124. However, it should be understood that the rectifier could as easily be external to the signal conditioning unit 100.

Similarly, it should be understood that the boundaries of the signal conditioning unit shown in FIG. 2 are not necessarily restricted, in the practice of the invention, to the particular blocks shown. For example, in FIG. 3 the oscillator circuit 104 is shown as part of the signal conditioning unit 100. In fact, the incorporation of the oscillator circuitry within the signal conditioning unit 100 is probably the best way to produce such a signal conditioning circuit at low cost. In addition, various engineering considerations would militate in favor of placing the oscillator 104 within the signal conditioning circuit 100. The point is, the boundaries of the signal conditioning circuit 100 should not be thought of as limited by the descriptions contained in FIGS. 2-6. They are merely illustrative of various circuits that embody the inventive concepts involved.

Figure 4:
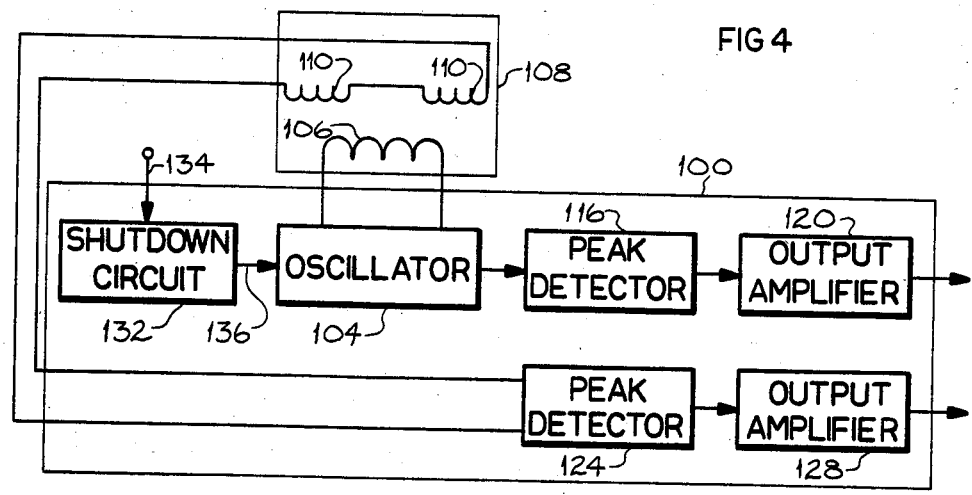
FIG. 4 is a simplified block diagram illustration of a signal conditioning circuit similar to the circuit of FIG. 3 except additionally incorporating a shutdown circuit within the signal conditioning circuit.

As a further elaboration upon the inventive concepts, FIG. 4 is provided to illustrate a signal conditioning circuit 100 that includes a shutdown circuit 132. The shutdown circuit responds to an externally applied signal on a line 134 which is applied periodically for the purpose of shutting down the oscillator. The shutdown circuit provides a signal for this purpose on the line 136 in response to the signal on the line 134. The oscillator 104 is shutdown in response to the signal on the line 136 in order to measure, by means of external circuitry (not shown), any DC offsets which may exists and which may be factored out once their magnitudes are determined.

Figure 3:
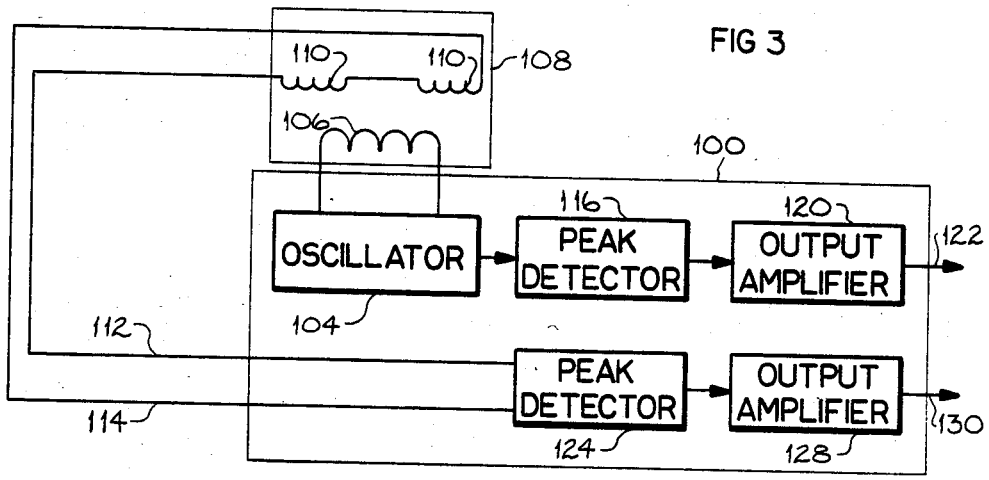
FIG. 3 is a simplified block diagram illustration of a signal conditioning circuit similar to the circuit of FIG. 2 except additionally incorporating an oscillator within the signal conditioning circuit.

A more detailed simplified schematic block diagram of the circuitry of FIG. 4 is shown in FIG. 5. The outline of the L/R VDT 108 of FIGS. 2, 3, and 4 is shown in broken lines 108a and 108b in FIG. 5. In other words, the primary winding 106 and the secondary windings 110 are shown separately, although they are the same physically as in the previous figures.

The circuitry shown in FIG. 5 is capable of IC implementation and of meeting positional accuracy requirements over a temperature range of −40° C. to +85° C. The circuit can be used by a wide variety of LVDT/RVDT types operating in a unipolar mode. The design philosophy departs from traditional synchronous demodulator/product detector methods of converting the L/R VDT's AC output into position proportional DC voltage in order to eliminate the numerous error sources in those methods and to be able to determine intrinsic DC offsets and changes in excitation amplitude. The temperature sensitivity of circuit gains are insignificant in their effect on system accuracy. In addition, the device is capable of positional accuracy to 0.013 inch or less in a phalf inch device. This takes into account effects of L/R VDT and circuit linearity, temperature, conversion resolution, and intrinsic circuit DC offsets.

The LVDT/RVDT signal conditioning circuit shown in FIG. 5 consists of three main sections. These are: (a) the LVDT/RVDT primary coil excitation oscillator; (b) the LVDT/RVDT primary coil excitation signal peak detector; and (c) LVDT/RVDT secondary coil output signal peak detector.

The primary coil's excitation oscillator is a Colpitts type consisting of a transistor 150, a resistor 152, a resistor 154, a resistor 156, and the LVDT/RVDT primary coil 106 as the inductor and a capacitor 158 and a capacitor 160 as the capacitive elements in the LC tank circuit. Fixed base bias is used and oscillations are sustained by emitter feedback. The components used yielded a resident frequency of roughly 5 KHz with a sine wave peak-to-peak voltage of roughly 2.5 to 3 volts across the LVT/RVDT primary coil. This technique results in considerable simplification over the more traditional approach of an external oscillator, wave shaper or filter, and driver forcing the external oscillator, wave shaper or filter, and driver forcing the LVDT/RVDT primary. It also makes excitation performance less dependent upon the matching and stability of resistive and capacitive elements such as are involved in external oscillators and filters used to obtain a useable sine wave to drive the primary. In addition, most of the energy used to provide the excitation is stored in the tank circuit elements with only a small amount used to sustain oscillations, resulting in far less dissipation in the overall excitation circuit than is typically dissipated by external oscillator/driver schemes.

A resistor 170 and a transistor 172 form a simple gating circuit that shuts down the oscillator 104 if a TTL "high" level voltage from an external source drives an input line 174. This is accomplished by transistor 172 saturating and essentially dropping the transistor 150 bias so low that transistor 150 ceases to conduct. The purpose of this gating circuit is to permit elimination of all AC components in the signal processing circuits, both excitation and L/R VDT output, so intrinsic circuit DC offsets may be measured and later factored out when positional calculations are being made.

The AC component of the oscillator signal on a line 176 is coupled to the peak detector stage 116 following. There are a number of considerations and tradeoffs involved in coupling the oscillator output to the peak detector. First, the impedance seen by the oscillator at the collector of transistor 150 must be sufficiently high that the oscillator is not loaded down. Second, resistors 178, 180, 182, and 184 provide both a signal path to ground and a current path for the inputs of the peak detector 116. Since a DC voltage is applied across a capacitor 186 via $V_{cc}$ through the primary 106 of the LVDT/RVDT 104 through the aforementioned resistors, there is a time constant for an exponential decay of this DC voltage to consider when oscillator shutdown is effected by an external signal on the line 174 and a change in the applied DC level occurs (i.e., transistor 150 no longer conducts and no longer provides a voltage division with respect to the LVDT/RVDT). The tradeoff is such that there first must be sufficient impedance to not load the oscillator but, at the same time, a fast enough time constant to permit the DC level shift that occurs on oscillator shutdown to exponentially decay out to a value so insignificant that it does not measureably affect the accuracy of subsequent measurements.

After passing through the capacitor 186 the signal appears on a line 188 and is next clipped just below ground level by a diode 190 so the peak detector 116 will not distort as it would if two large a signal went below ground level at an op map 192 input. Again, to preclude loading the oscillator too much, resistor 184 provides a sufficiently high load to the input signal on the line 184 so that the clipping of diode 190 does not affect oscillator performance. Positive peaks appear across resistors 180 and 182. Given that capacitor 186 is, in this example, 0.0039 microfarads, the net loss in signal due to network attenuation is roughly 8%. This loss is not important inasmuch as end of line calibration will determine the overall system sensitivity (LVDT/RVDT and circuitry together) to be used in positional calculations.

The circuitry shown in FIG. 5 is a representation of a successful breadboard embodiment of the invention. In other words, the circuit represents in FIG. 5 is an engineering model. It will be noted that LM 124 and LM 139 type devices are used in the circuit of FIG. 5. Although the invention is not necessarily restricted to usage of such devices, it should be understood that are several reasons behind the choice of these devices to model the circuit. These reasons include the fact that both are low powered devices with very low offsets; they do not need external offset adjustments; and the gain is such, particularly on the LM 139 comparator, that uncertainty is insignificant compared to the desired resolution. In addition, for both devices, the Common Mode Voltage Range (CMVR) is (for a 0 to +5 volts single power supply scheme) from 0 to +V−1.5 volts or, in in other words, 0 to 3.5 volts. These devices are preferred over other types whose CMVR has deadbands of from 1 to 1.5 volts inside the power supply rails at both the +V and −V ends. Typically, these deadbands are relatively fixed amounts rather than proportional to the power supply span in the case of a single power supply. This would mean that the usable range for other devices could be as small as between 1.5 volts and 3.5 volts (5-1.5 volts) for a total dynamic range of only 2 volts, centered about the one half $V_{cc}$ level or 2.5 volts typical. In addition, the circuit design is simpler due to being able to reference, for example, both the excitation and the LVDT/RVDT output to ground when the output to their respective peak detectors rather than build in some $\frac{1}{2}V_{cc}$ reference source to offset both signals in order to stay away from a deadband near ground. Also, the absence of a −V deadband allows a wider dynamic range (i.e., 3.5 volts) in which the useful signal, the positive peaks from their 0 crossup, may operate if necessary. It will be seen below that the absence of the −V deadband is most useful when coupled with techniques to minimize the +V deadband to the point of enhancing the amplitude and resolution of the positional measurement signal. Because of these considerations, it would be a considerable undertaking, resulting in more complex circuitry, to use devices other than those of the LM 124 and LM 139 genre or their equivalents.

The peak detector 116 consists of a comparator 192 and a switched input integrator 194. A clipped input signal on a line 196 goes to the inverting input of the comparator 192 and the output of the integrator 194 on a line 198 ultimately goes to the noninverting input of the comparator. Whenever the inverting input exceeds the noninverting input, the comparator 192 will, in effect, switch a resistor 200 into the integrator with ground as the driving signal (bear in mind that for single power supply configurations, the op-amp quiescent levels are $\frac{1}{2}V_{cc}$ or 2.5 VDC for a five VDC power supply; hence, both ground and $V_{cc}$ are active driving signals relative to the quiescent level). This causes the integrator to ramp in the positive direction until a scaled version of its output on a line 201 equals or exceeds the inverting input level to the comparator 192. When this condition is reached, the comparator goes into a high impedance state and resistor 200 no longer connects to ground, leaving only a resistor 202 connected to a driving voltage ($V_{cc}$) on a line 204. Since resistor 202 is much larger than resistor 200 and is also connected to $V_{cc}$, the integrator 194 slowly ramps (decays) down between each postive going peak from the input. Gain in this stage is provided by the voltage division of a resistor 206 and a resistor 208. Essentially, the output of the integrator has to be that level that when applied to the voltage divider resistors 206, 208 results in a match to the input signal to the comparator. In the breadboard configuration illustrated in FIG. 5, for oscillator components used and using a Schaevitz E500 LDVT at 5 KHz, the gain was set to 1.2. This yields a 2.2 peak volt signal at the output of the integrator with roughly 2.5 volt margin above ground.

The peak detection technique disclosed is used in preference to the typical op-amp driven RC circuit for a number of reasons. Since changing signals may involve either an increase or decrease in peak amplitudes, the peak detector must be responsive to maximum input signal peak amplitude slew rate on either the increase or decrease. Next the error from peak refresh to peak refresh must be constrained to some specified maximum. This is because the LVDT/RVDT output may be sampled by an ADC (not shown) anywhere from at the moment the peak occurs when a minimum error condition would exist to just before the next refresh when the peak detector "droop" error would be at a maximum. Concurrent to the ability to respond to a maximum signal input signal peak slew on a decreasing level, it is desirable to have the peak detector be able to go to whatever the intrinsic circuit DC level is within a reasonable and predictable time subsequent to the reception of an oscillator shutdown signal on the line 174.

A conventional peak detector with a bleeder resistor to allow decay to successively decreasing amplitude peaks has a different relationship between its decay slew rate and the steady state peak refresh to peak refresh error than the comparator/integrator peak detector disclosed herein. The initial objective, based on a 5 KHz excitation frequency (which translate to 200 microseconds between refresh), was to minimize droop to approximately 25 mV. This number was based mostly on the design goal of a maximum of just slightly less than 2.5 V for a full scale signal on the peak detector outputs of both channels. This would amount to a one percent error at full scale or 0.005 inches in a one half inch travel L/R VDT device. A quick calculation for both the conventional peak detector with a bleeder resistor, and the method used shows that for a 220 K resistor and a 0.082 microfarad capacitor, the droop voltage at full scale is 27 mV. However, there is a dramatic difference in slew rate capabilities. If one assumes a full scale slew time of 100 ms, it can be shown that the conventional peak detector with the bleeder scheme has asymptotically approached the final near 0 V level to within 10 mV at 100 ms whereas the method using the comparator/integrator has gone directly to and held at the final valve in only 18.2 ms. What this means is that for a given error limit, the comparator/integrator method slews faster and holds to a final level far better than the conventional peak detector. This also means that for the comparator/integrator method, a sizeable increase in the decay slope resistors could be tolerated to decrease the slew rate and still be compatible with the position slew rate with a decrease in the droop error by the same proportionality (e.g., decrease slew rate by a factor of two and decrease droop by the same factor: 18.2 ms to 36.4 ms full scale slew period, 27 mV to 13.5 mV droop). To try to improve the slew rate of the conventional peak detector by decreasing the bleeder resistor will cause more droop error. In summary, the linear slope derived by the comparator/integrator method disclosed herein offers more advantages in the droop error versus slew rate tradeoff than the exponential slope that one gets with conventional peak detector methods.

The attack time (i.e., the slew rate when responding to a peak) is on the order of fifty times faster than the decay rate. This permits the peak detector to track the profile of the sine wave peak whenever the input signals exceeds the present value at output of the integrator. The practice of the invention is not restricted to such an exact figure, however.

Periodic oscillator shutdown via an external circuit presenting a shutdown signal on the line 174 is desirable to measure the DC offsets which vary as a consequence of temperature changes and aging. A conventional peak detector only asymptotically approaches the DC offset level because of the nature of the exponential decay. With the values used, the conventional method was shown to be only within 10 mV of the final value after 100 ms, whereas the comparator/integrator method had ramped down to and held at the final value in 18.2 ms. Again, if affected by slew rate versus droop error tradeoffs, the comparator/integrator method still offers the advantage of eliminating the ambiguity of the asymptotic approach of the conventional peak detector to the final value.

Another important consideration in the droop error versus slew rate tradeoff is the excitation frequency itself. Droop error is directly affected by the excitation frequency. In effect, the longer the period between peak refresh, the larger the droop regardless of peak detection method used. Slew, on the other hand, is dictated by the rate of positional change of the LVDT/RVDT. Picking a slew rate in the peak detector to be compatible with the positional change slew rate then fixes what the droop error will be for different excitation frequencies. What this says, in effect, is that for a peak detector slew rate that is just inside of that of the positional slew rate, the droop error will be twice as much for 2.5 KHz excitation as it would be for 5 KHz excitation. It is reasonable, therefore, that if nothing is lost in the LVDT/RVDT performance by going to a higher excitation frequency, the higher frequency should be used to both reduce droop error and the size of tuning capacitors used in the oscillator.

Note that there is a certain amount of signal "dither" around the DC level when the shutdown signal is imposed. This is because the integrator always has the decay rate imposed because of the permanent hookup of the integrator resistor affecting decay to $V_{cc}$. Accordingly, once the DC level is acquired, a decay will occur until the comparator detects sufficient difference between the DC level input to itself and the integrator output and restores the integrator output to a proper level. The periodicity and amplitude of this "dither" is a function of comparator and op-amp gains plus propagation delays. Observation of this "dither", which shows up as a saw-tooth waveform on a oscilloscope, shows it to have an amplitude of roughly 25 mV, or roughly the same error as the droop error at 5 KHz.

In addition, certain timing constraints dictate when measurements are feasible after effecting oscillator shutdown and reenabling the oscillator with the removal of the shutdown signal along the line 174. From a maximum output condition and using the current integrator RC components, it will take roughly 18.2 ms for the peak detector to decay down to the DC level. This is true for both the excitation and the LVDT/RVDT output channels. The Q of the Colpitts oscillator tank circuit using the LVDT/RVDT is low enough that oscillation damp out in one half of a cycle. However, on turn-on there is almost a fifty percent overshoot on the peak of the first cycle. For the excitation channel, and for the LVDT/RVDT output channel at a significant displacement, the peak detectors will only partially ramp up toward the peak on the attack slope. Observations shows that for maximum signals, it takes roughly 1 ms for the convergence of the signal damping down to steady state and the peak detector finally tracking the peaks to occur. At lesser signals nearer to the null point of the RVDT/LVDT output channel, the initial overshoot is readily acquired by the peak detector, but successive peaks and the steady state level takes some time for the peak detector to acquire since it has to decay down to that level and the decay slope rate.

Although the period of time is not completely necessary for the component values shown in FIG. 5, it is suggested that the use of the shutdown input on the line 174 and the sampling of DC levels be synchronized externally with the timed activities of the external controller. For instance, if the controller's activities are timed to sample the LVDT/RVDT position at 40 ms intervals, the shutdown signal could be asserted on a selected 40 ms event. Upon the next 40 ms event, the sampling of the excitation and the LVDT/RVDT channel would occur. The next 40 ms event following the completion of the channel sampling (assuming conversion times are taken into account) would disable the shutdown signal thereby enabling the oscillator to resume operation. At the 40 ms period then following, normal excitation channel and LVDT/RVDT output channel sampling for positional measurements could resume. Since the overall period of time involved is relatively lengthy compared to other events, the scheduling of the shutdown event would be on the order of once every few seconds or more.

Once any DC level has been established by the peak detector 116, it is fed on the line 198 to an output amplifier. The configuration used is best explained after the trade-offs of various op-amps is described. First, one can get op-amps with conventional, single stage inputs which have dead zones roughly 0.6 V inside the power supply rails. The low level signals that may exist near ground make this type of dead zone undesirable. One can also get PNP darlington input op-amps (such as the LM 124) wherein inputs can go all the way to ground, but cannot get any higher than $V_{cc}$ minus 1.5 VDC. For a 5 volt power supply, this means that the dynamic range is limited to 0 to 3.5 volt. Ideally, one would like to operate over a wider range on the output so the bit to inch resolution of the following ADC would be finer (i.e., smaller displacement intervals per bit). If one is constrained to a 3.5 volt range representing the entire displacement span of the LVDT/RVDT, then the bit to inch resolution is coarser if the output dynamic range could more closely approach the +V rail (+5 VDC). Given that with the PNP darlington inputs, the ground level dead band is eliminated, it is the +V rail dead band that needs to be minimized in order to expand the dynamic range to obtain finer resolution.

To do this, a special output stage is added. This consists of a PNP transistor 210 which, when driven by an op-amp output signal on a line 214, provides an output signal on a line 216 which can approach +V rail as close as saturation voltage across the PNP will permit. A pair of resistors 218, 220 divide the output of the op-amp 212 in half. Normally, if the input to the op-amp 212 is around 0 volts, the output will limit out at around 3.5 volts. Since the PNP emitter is at $V_{cc}$ or +5 VDC, the applied voltage across resistor 218 and the base emitter junction would be roughly 1.5 volts. Without resistor 220, transistor 210 would always be in some state of conduction and the output voltages for near zero input voltages would be in error. By putting resistor 220 between the base and emitter, two things occur. First, a modest pullup to op-amp 212 occurs which helps diminish the dead band. Second, the voltage division is such that with the pullup assist, the base emitter voltage is below $V_{be}$. Therefore for a 0 volt input, it is possible for transistor 210 to cease conducting, resulting in a 0 volt output. For anything greater than a 0 volt input, the op-amp 212 will drive the base of transistor 210 the requisite amount since it now can control base drive all the way from cutoff to saturation. When the peak detector outputs a voltage to the op-amp 212 inverting input, the output of the op-amp 212 will drive transistor 210. The collector current through transistor 210 causes a voltage to appear across a resistor 222 and a resistor 224. Because resistors 222 and 224 are equal, the voltage at the collector of transistor 210 (which is the output point), with respect to ground, is twice that of the node 226 connecting resistor 222 and resistor 224. To satisfy the op-amp, this node voltage must also equal the input into inverting side of the op-amp. Therefore, this is a gain 2 stage wherein the output point at the collector of transistor 210 is always twice the input voltage to op-amp 212. Important to note, however, is the fact that the output is capable of operating from ground to almost +V, eliminating the greater percentage of the +V deadband. By design, all preceding stages do not produce a voltage greater than 2.2 volts and thusly are well guarded against getting into the device deadbands. By tailoring these stages to approach, at a maximum, 2.2 volt outputs, making the last stage a gain 2 function was simply assumed since the saturation voltage across transistor 210 can be kept to less than 0.5 volts (permitting a maximum output of 4.5 volts) and the gain to function on a maximum of 2.2 volts inputs would yield a 4.4 volt output: a value reasonably and safely less than theoretical maximum output. A resistor 228 and a capacitor 230 provide degenerative AC feedback to eliminate oscillations that otherwise occur without this compensation.

The LVDT/RVDT secondary output signal conditioning circuit is, for the most part, identical to the peak detector 116 and output stage of the oscillator/excitation stage just described above. The only significant difference is that the gain is four which will amplify the peak detector output up to a maximum of near 2.2 volts for a maximum input from the secondary. A resistor 232 provides just a slight DC offset from ground by a simple voltage division with the 31 secondary winding 110. The peak detector 124 and output stages are otherwise identical to the oscillator/excitation stages just described above.

The circuit design utilizes ratiometric means to set gains. By properly placing the gain setting resistors in any IC, drifting as a function of temperature changes will uniformly and proporationally affect these elements. Accordingly, changes in gain as a function of temperature will be minimum.

By having a measurement channel for both excitation and LVDT/RVDT output, true ratiometric measurement of position is possible. The LVDT/RVDT output is a function of both the excitation voltage and the position along with a sensitivity factor. End of line calibration of the overall system by using calibration displacements will yield an overall sensitivity factor that includes both the LVDT/RVDT and the circuit which can be stored in controller memory and applied to measured excitation and measured output to determine position.

The circuit design shown in FIG. 5 was tailored to a Schaevitz E500 LVTD with 5 kilhertz excitation. To adjust to other LVTD or RVTD with different inductive values in the primary, or to change the excitation frequency, it will be necessary to change the values of capacitor 158, 160, resistor 152, resistor 154, and resistor 156. The ratio between capacitors 158 and 160 should remain the same (i.e., close to a 3:1 ratio as standard values permit) with absolute values adjusted to whatever puts the tank circuit on or about the desired excitation frequency. Note that the bias of transistor 150 in conjunction with the emitter resistor establishes the power amplification which, in turn is reflected as the excitation amplitude in the tank circuit. A change in the load (i.e., tank circuit) requires a change in the other elements to keep the same excitation levels in terms of current and voltage (i.e., power).

Functional testing of the breadboard verified the validity of the concepts being used. The circuit demonstrated response over the entire linear range. For the particular LVDT and circuit breadboard, the demonstrated sensitivity was nominally 7.2 V/inch (7.2 mV/0.001 inch) with demonstrated linearity with less than one percent error over the region between 0.100 inch and 0.500 inch. In terms of resolution, the above sensitivity at a convergence value of 19.5 mV/bit yields a resolveable incremental position change of roughly 0.0027 inches/bit over this 0.400 inch span. Temperature testing of the most sensitive item, the oscillator section, demonstrated that over the prescribed temperature range (−40° C. to +85° C.), using CKO5 type capacitors for capacitor 158, capacitor 160, and capacitor 186 and RN 55 type 1% metal film resistors for resistor 152, resistor 154, and resistor 156, at design values the degradation in oscillator amplitude, and hence excitation, amounted to less than 0.25 volts peak at temperature extremes. Substituting resistors and capacitors with ±30% deviations from design values indicated that these same resistors would best be kept external in an IC implementation for accuracy, temperature stability and flexibility if changing to different LVDT/RVDT's. While the oscillator remains operational at these simulated component tolerance deviation extremes at temperature extremes, amplitude was degraded too much. Since IC variations can typically amount to ±30%, the external component route for resistors 152, 154, and 156 was empricaly determined to be a better engineering practice and choice. This choice was also only at the cost of one extra IC pin.

In addition, other external component decisions were made. The next was the peak detector gain setting resistors 206, 208, and their counterparts resistors 234, 236 and peak detector 124. Since different LVDT/RVDT's may be used with different sensitivies from the Schaevitz E500 used in the demonstration, a generic IC would have to adapt to greater or lesser sensitivity and oscillator amplitude to maintain the same approximate system sensitivity, accuracy, and resolution. Finally, the output stage phase compensation was left entirely external inasmuch as the difference in needed compensation for a breadborad versus an actual IC is not known at this time.

Although the invention has been shown and described with respect to a best mode embodiment thereof, it should be understood by those skilled in the art that foregoing and various other changes, omissions, and additions in the form and detail thereof may be made therein without departing from the spirit and scope of this invention.

That which I claim, and desire to secure by Letters Patent, is:

1. Signal conditioning circuitry for providing an output signal indicative of L/R VDT primary coil excitation waveform voltage amplitude and for providing an output signal indicative of the voltage across a selected one of the L/R VDT's secondary coils and therefore indicative of L/R VDT displacement on one side of the null only, comprising:
 a first linear slope peak detector, responsive to a present rectified signal value of the primary coil excitation voltage amplitude for comparing said primary's present rectified signal value to a stored first peak detector output signal indicative of the peak amplitude of a past rectified signal value of said primary excitation and for changing said stored first peak detector output signal value to correspond to and be indicative of said present primary rectified signal value; and
 a second linear slope peak detector responsive to a present rectified signal value of the selected secondary coil's voltage amplitude for comparing said present secondary rectified signal value to a stored second peak detector output signal indicative of the peak amplitude of a past secondary rectified signal value and for changing said stored second peak detector output value to correspond to and be indicative of said present rectified rectified signal value.

2. A unipolar L/R VDT driver/signal conditioning circuit driven by a unipolar DC source, comprising:

oscillator means, reponsive to a DC source for providing a sine wave output signal for driving the primary coil of the L/R VDT, said oscillator means having a tank circuit having said primary coil as an inductive element;

first rectifier means, responsive to said sine wave output signal for rectifying said sine wave output signal and providing a first rectified signal indicative of the present magnitude of said sine wave output signal;

first peak detector means, responsive to said first rectified signal for comparing the peak amplitude of said rectified signal magnitude to a stored first peak detector output signal magnitude indicative of the peak amplitude of a past rectified signal magnitude and for changing said stored output signal magnitude to correspond to and be indicative of said present magnitude;

second rectifier means, responsive to the secondary output signal of the L/R VDT secondary coil coupled from said primary coil and indicative of the position of the core of the L/R VDT, for rectifying said secondary output signal and providing a second rectified signal indicative of the present position of said core; and second peak detector means, responsive to said second rectified signal for comparing the peak amplitude of said rectified signal magnitude to a stored second peak detector output signal magnitude indicative of the peak amplitude of a past rectified signal magnitude and for changing said stored output signal magnitude to correspond to and be indicative of said present position.

3. The signal conditioning circuitry of claim 1 wherein said peak detectors each comprise:

an integrator having an amplifier with inverting and noninverting input ports, and having an output signal port, and having a capacitor connected between said amplifier's output port and said input port, and having a second reference voltage connected to said amplifiers noninverting input port, said integrator having an output signal with a magnitude indicative of the peak value of an incoming time varying signal presented to said peak detector;

first resistor means, connected between said inverting input port and a first reference voltage for providing a charging path for said capacitor;

a comparator, responsive to the present value of said incoming time-varying signal and responsive to a scaled signal having a magnitude indicative of said integrator's output signal, for comparing said present value of said incoming time-varying signal to said scaled signal and for providing a low impedance output state at an output port thereof in the presence of said present value of said incoming time-varying signal having an absolute value greater than the absolute value of said scaled signal and for providing a high impedance state at said output port otherwise; and second resistor means, having a resistive value much less than the resistive value of said first resistor means, connected between said comparator's output port and said integrator's inverting input port for providing a signal indicative of said incoming time-varying signal's peak value to said integrator.

4. The signal conditioning circuit of claim 2 wherein said peak detectors each comprise:

an integrator having an amplifier with inverting and noninverting input ports, and having an output signal port, and having a capacitor connected between said amplifier's output port and said input port, and having a second reference voltage connected to said amplifier's noninverting input port, said integrator having an output signal with a magnitude indicative of the peak value of an incoming time varying signal presented to said peak detector;

first resistor means, connected between said inverting input port and a first reference voltage for providing a charging path for said capacitor;

a comparator, responsive to the present value of said incoming time-varying signal and responsive to a scaled signal having a magnitude indicative of said integrator's output signal, for comparing said present value of said incoming time-varying signal to said scaled signal and for providing a low impedance output state at an output port thereof in the presence of said present value of said incoming time-varying signal having an absolute value greater than the absolute value of said scaled signal and for providing a high impedance state at said output port otherwise; and second resistor means, having a resistive value much less than the resistive value of said first resistor means, connected between said comparator's output port and said integrator's inverting input port for providing a signal indicative of said incoming time-varying signal's peak value to said integrator.

* * * * *

UNITED STATES PATENT AND TRADEMARK OFFICE
CERTIFICATE OF CORRECTION

PATENT NO. : 4,591,795

DATED : May 27, 1986

INVENTOR(S) : Gary A. McCorkle

It is certified that error appears in the above-identified patent and that said Letters Patent is hereby corrected as shown below:

Column 3, line 64.      Cancel "prinary" and substitute therefor -- primary --

Column 15, line 27.     Cancel "proporationally" and substitute therefor -- proportionally --

Column 16, line 33.     Cancel "breadborad" and substitute therefor -- breadboard --

Column 17, line 1.      Cancel first occurrence of "rectified"

Column 17, line 5.      Cancel "reponsive" and substitute therefor -- responsive --

Column 10, line 21.     Cancel "op map" and substitute therefor -- op amp --

Column 13, line 27.     Cancel "along" and substitute therefor -- on --

Signed and Sealed this

Sixth Day of October, 1987

*Attest:*

DONALD J. QUIGG

*Attesting Officer*       *Commissioner of Patents and Trademarks*